United States Patent [19]

Shuey

[11] 4,139,878
[45] Feb. 13, 1979

[54] APPARATUS FOR SENSING A HIGH PHASE SIGNAL FROM A MULTI-PHASE AC LOAD CIRCUIT

[75] Inventor: Kenneth C. Shuey, Cridersville, Ohio

[73] Assignee: Westinghouse Electric Corp., Pittsburgh, Pa.

[21] Appl. No.: 802,930

[22] Filed: Jun. 2, 1977

[51] Int. Cl.² ............................................. H02H 3/08
[52] U.S. Cl. ...................................... 361/93; 250/551; 307/311; 323/9; 361/88
[58] Field of Search ...................... 361/88, 90, 91, 92, 361/86, 87, 98, 100, 93, 94, 95, 96, 173, 175, 176, 177; 340/253 R, 253 A, 253 Z, 248 A, 248 B, 248 C; 307/318, 295, 308, 311; 363/50, 54, 57, 58, 51; 323/9, 21, 8, 24; 250/551; 324/96, 97, 87

[56] References Cited

U.S. PATENT DOCUMENTS

| | | | |
|---|---|---|---|
| 3,321,631 | 5/1967 | Biard et al. | 307/311 X |
| 3,610,938 | 10/1971 | Cook et al. | 250/551 |
| 3,811,073 | 5/1974 | Shuey et al. | 361/56 X |
| 3,925,709 | 12/1975 | Mitchell et al. | 307/311 X |
| 3,999,087 | 12/1976 | Compton | 361/92 X |

Primary Examiner—Patrick R. Salce
Attorney, Agent, or Firm—G. H. Telfer

[57] ABSTRACT

Individual rectified phase voltages are produced and applied to individual opto-isolator units whose output photo diodes are connected in a series string. Each photo diode has a zener diode connected across it with the zener diodes mutually connected in series. A direct voltage applied to the photo diode string is blocked unless one of the photo diodes is made conductive by having received radiation indicative of an overcurrent condition. The responsive photo diode forms a current conduction path with the zener diodes across each of the other photo diodes, which latter may remain nonconductive, for developing at terminals a direct voltage upon occurrence of a predetermined overcurrent, which voltage is useful for application to a trip circuit or the like for interruption of the load circuit in which the overcurrent occurs.

3 Claims, 2 Drawing Figures

4,139,878

APPARATUS FOR SENSING A HIGH PHASE SIGNAL FROM A MULTI-PHASE AC LOAD CIRCUIT

BACKGROUND OF THE INVENTION

1. Field of the Invention

This invention relates to multi-phase power systems and, more particularly, to apparatus for sensing an overcurrent on one phase of a multi-phase system.

2. Description of the Prior Art

Alternating current, solid state, remote power controllers are apparatus designed for solid state switching of power circuits, such as in aerospace applications, where a high degree of compactness as well as reliability are prime goals. To achieve compactness and to permit a high degree of miniaturization, large discrete components, such as transformers, are to be avoided. Hence, it has been recognized that current transformers are not an acceptable means of sensing line current for overcurrent protection in AC power controllers of this type. In U.S. Pat. No. 3,811,073 by Shuey and Baker, issued May 14, 1974, is presented an alternating current sensing circuit and method that avoids transformers and utilizes small resistive shunts in each leg of inverse parallel thyristor power switches to produce a small full-wave rectified voltage that is proportional to load current. This voltage may be processed by an operational amplifier to produce a desired overload trip circuit or may be used to drive opto-isolator light emitting diodes to achieve an overcurrent circuit with isolation from the AC line. Such current sensing circuits are satisfactory, particularly for single phase systems. On multi-phase, such as three-phase, systems some further means has to be found in order to provide an overcurrent trip signal with similar trip times for single-phase conditions and three-phase conditions.

The above referred to patent also gives additional general background information relating to alternating current remote power controllers of the general type to which the invention is directed.

SUMMARY OF THE INVENTION

In accordance with the present invention, individual rectified phase voltages are produced and applied to individual opto-isolator units whose output photo diodes are connected in a series string. Each photo diode has a zener diode connected across it with the zener diodes mutually connected in series. A direct voltage applied to the photo diode string is blocked unless one of the photo diodes is made conductive by having received radiation indicative of an overcurrent condition. The responsive photo diode forms a current conduction path with the zener diodes across each of the other photo diodes, which latter may remain nonconductive, for developing at terminals a direct voltage upon occurrence of a predetermined overcurrent, which voltage is useful for application to a trip circuit or the like for interruption of the load circuit in which the overcurrent occurs.

In the opto-isolator units, the detector photo diodes have a current proportional to the current through the light emitting diodes such that the higher the emitter current, the higher the detector current, and consequently the faster the detection circuit operates. This may be referred to as an inverse trip time versus current.

It is therefore seen that the present invention provides effective detection of an overcurrent of one phase with a capability consistent with that of prior art current transformer sensing techniques but while utilizing a minimal number of small semiconductor devices.

PREFERRED EMBODIMENTS OF THE INVENTION

Figure 1:
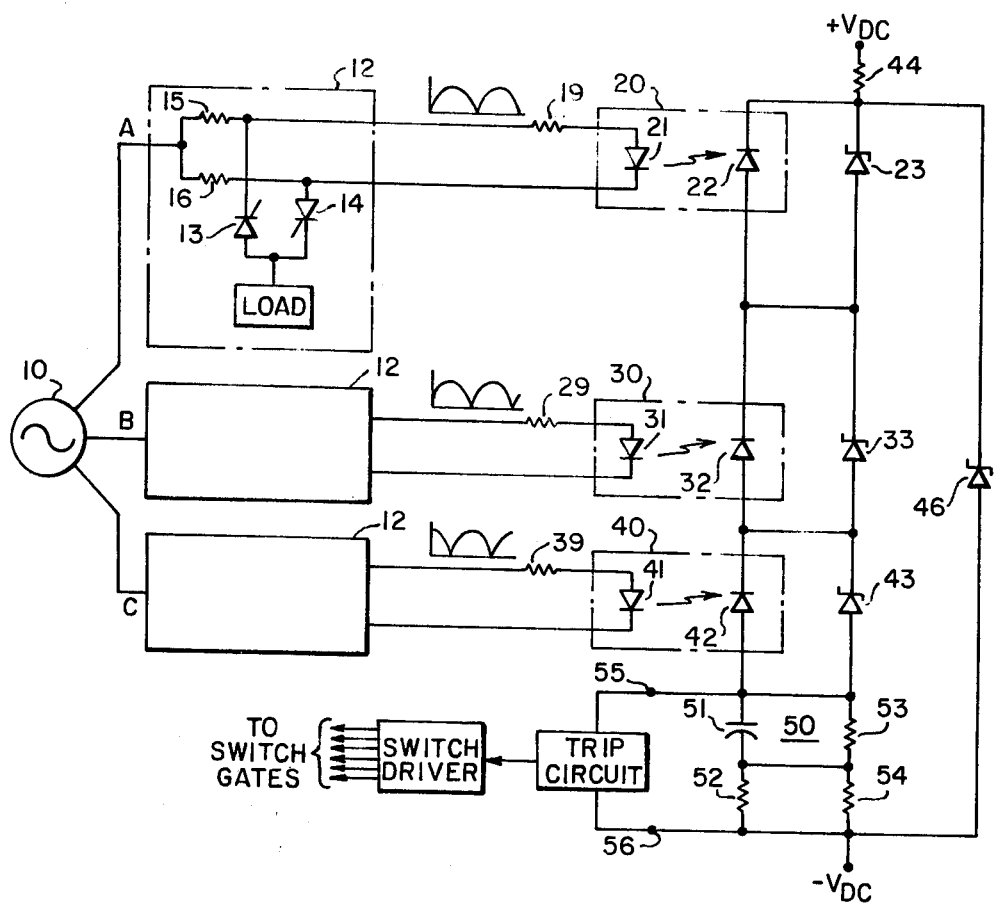
FIG. 1 is a circuit schematic diagram of an AC power controller incorporating sensing apparatus in accordance with one embodiment of the present invention.

Referring to FIG. 1, a system is shown in which an AC generator 10 is associated with three-phase load circuits of which the circuit 12 for one phase A is shown. The circuits for other phases B and C would be of like character. Power switches 13 and 14 are inverse parallel connected thyristors connected between the generator and load in circuit 12. In accordance with U.S. Pat. No. 3,811,073, resistive shunts 15 and 16 are employed connected respectively to each of the thyristors 13 and 14 to develop a full-wave rectified voltage. For this purpose the thyristors themselves serve as rectifier means.

Each of the rectifier phase voltages is supplied to individual opto-isolator units 20, 30 and 40. The opto-isolator units have light emitting diodes 21, 31 and 41 connected respectively through resistances 19, 29 and 39 to the rectified voltages and as a result a current is developed which may under normal conditions be insufficient to turn on the light emitting diodes. The light emitting diodes will however turn on if there is a predetermined overcurrent on its phase.

On the output or secondary side of the opto-isolator units 20, 30 and 40 there is a string of photo diodes 22, 32 and 42 connected in series, each optically related with one of the individual light emitting diodes 21, 31 and 41 of the input side. In parallel with each of the photo diodes 22, 32 and 42 is a voltage threshold detector 23, 33 or 43, conveniently a zener diode. The zener diodes are connected in a series string. Both the zener diodes and the photo diodes are poled in the same direction which is against the direction of potential set up by a direct voltage source ($+V_{DC}$).

A resistance 44 and a zener diode 46 connected respectively in series with and across the diode strings set the overall voltage level for the circuit.

Each of the individual zener diodes 23, 33 and 43 associated with the photo diodes has a like breakdown voltage, for example, 8.2 volts. The fourth zener diode 46 is selected so that it has a breakdown voltage that is near to but less than the sum of the breakdown voltages of the other three zener diodes, for example, 22 volts.

When one of the photo diodes such as 22, carries current, as results from reception of a radiation signal indicative of an overcurrent condition, the two zener diodes 33 and 43 not paralleled with the conductive photo diode 22 will form a current carrying path for the detected signal because those two zener diodes will become conductive as they must sustain or they see the entire voltage across the string; $V_{DC}$ being of sufficient magnitude for that purpose. Then a capacitor detector 50 connected as shown will have a voltage equal to the difference in the breakdown voltage of the fourth zener diode 46 and the combined breakdown voltages of those two zener diodes 33 and 43 (e.g., 22-16.4 V.) available as a detecting signal. The signal is provided at terminals 55 and 56 for a trip circuit or the like to actuate a switch driver operatively associated to thyristor gates in the phase circuits to permit interruption.

Figure 2:
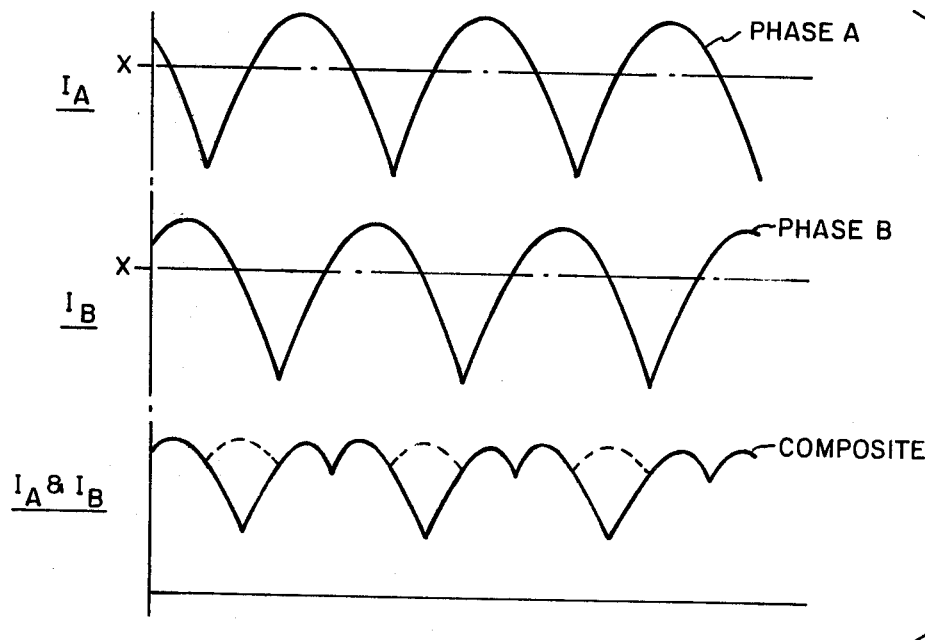
FIG. 2 is a set of curves illustrating performance of apparatus in accordance with the present invention.

Referring to FIG. 2, it is assumed that phases A and B are both in an overcurrent condition, i.e., above X. Which ever one is instantaneously higher will cause action by the diode strings to form a current to the capacitor detector 50. The composite seen by the detector is shown in the third curve AB.

It is therefore seen that the present invention provides efficient means for overcurrent detection of any one phase with a minimal number of components and utilizes means for generating radiation signals from each of the individual rectified phase voltages, means for receiving the radiation signals and for forming direct voltages for each phase proportional to the magnitude of each of the radiation signals and voltage detection means including threshold voltage detectors for each phase direct voltage and to provide a current path for a signal indicating an overcurrent on any one phase.

By way of further example the following table identifies specific components that may be used in apparatus in accordance with this invention in accordance with one embodiment, although the components may be varied as will be apparent from known practice.

| | |
|---|---|
| Opto-isolators 20, 30, 40 | MCD2 |
| Resistors 22, 32, 42 | 200 ohms |
| Resistor 44 | 5,000 ohms |
| Resistor 52 | 50,000 ohms |
| Resistor 53 | 1.8 negohms |
| Resistor 54 | 10,000 ohms PTC |
| Capacitor 51 | 2.2 microf. |
| Zener diodes 23, 33, 43 | 5.6 V. |
| Zener diode 46 | 15 V. |
| $V_{DC}$ | 28 V. DC |

A significant advantage of the present invention is to provide the sensing function in a manner essentially equivalent to that which could be performed using current transformers but without the need for such bulky elements such as transformers or an eight diode bridge that would be necessary for use with three current transformers.

What we claim is:

1. Electronic apparatus, for sensing a high phase signal from a multi-phase AC load circuit, comprising:
   rectifier means for producing individual rectified phase voltages proportional to load current for each phase voltage;
   means for generating radiation signals from each of said individual rectified phase voltages;
   means for receiving said radiation signals and for forming direct voltages for each phase proportional to the magnitude of each of said radiation signals, said means for receiving said radiation signals comprising a device for each phase mutually interconnected in a series string with means for applying direct current thereto;
   voltage detection means comprising a threshold voltage detector device for each phase direct voltage electrically parallel with said means for receiving said radiation signals for each phase, said voltage detection devices being mutually connected in a series string so as to be rendered conductive upon the current of a signal at one of said means for receiving said radiation signals indicative of a high phase signal;
   means for developing at output terminals; and said output terminals a direct voltage upon occurrence of a predetermined overcurrent as indicated by conduction of any one or more of said means for receiving said radiation signals.

2. Electronic apparatus in accordance with claim 1 wherein:
   said means for generating radiation signals comprises a light emitting diode for each phase;
   said means for receiving said radiation signals comprises a photo diode for each phase; and
   said voltage detection means comprises a zener diode connected individually in parallel with each of said photo diodes of each phase.

3. Electronic apparatus in accordance with claim 1 wherein:
   said means for developing at said output terminals a direct voltage upon occurrence of a predetermined overcurrent comprises a capacitor detector comprising a capacitor and a network of resistive elements coupled in series with both said means for receiving said radiation signals and said voltage detection means and supplying to the output terminals a signal for a trip circuit to actuate means operatively associated with said rectifier means for interruption of a conductive path therethrough.

* * * * *